United States Patent [19]

Klein

[11] 4,234,244
[45] Nov. 18, 1980

[54] PORTABLE MICROFILM VIEWER

[76] Inventor: Jeshayahu Klein, 212 Rutledge St., Brooklyn, N.Y. 11211

[21] Appl. No.: 856,358

[22] Filed: Dec. 1, 1977

[51] Int. Cl.³ .............................................. G02B 27/02
[52] U.S. Cl. ...................................... 350/241; 40/362; 40/363; 40/367; 352/78 R
[58] Field of Search .................... 350/235–241, 350/138, 145–146, 238, 134–135, 141; 353/26 R, 68, DIG. 2; 40/362–367, 386, 522, 471, 518; 352/78 R, 129; 35/75–76; 242/67.4, 201

[56] References Cited

U.S. PATENT DOCUMENTS

| | | | |
|---|---|---|---|
| 120,072 | 10/1871 | Jeffers | 35/76 |
| 697,377 | 4/1902 | Maxwell | 40/522 |
| 1,240,905 | 9/1917 | Troppman | 350/171 |
| 1,948,588 | 2/1934 | Martin | 350/255 |
| 2,183,523 | 12/1939 | Wood | 350/255 |
| 2,877,952 | 3/1959 | Brough | 235/132 A |
| 3,120,066 | 2/1964 | Reeves | 35/76 |
| 3,387,778 | 6/1968 | Althaus | 235/103 |
| 3,589,043 | 6/1971 | Klein | 40/367 |
| 3,672,593 | 6/1972 | Knowles et al. | 242/201 |
| 3,806,235 | 4/1974 | Wangerin | 353/26 R |
| 3,841,745 | 10/1974 | Kaye et al. | 353/26 R |

FOREIGN PATENT DOCUMENTS

| | | | |
|---|---|---|---|
| 355812 | 7/1922 | Fed. Rep. of Germany | 350/145 |
| 1286310 | 1/1969 | Fed. Rep. of Germany | 350/241 |
| 1395748 | 3/1965 | France | 352/129 |
| 534896 | 3/1941 | United Kingdom | 350/238 |

*Primary Examiner*—John K. Corbin
*Assistant Examiner*—Wm. H. Punter
*Attorney, Agent, or Firm*—Israel Nissenbaum

[57] ABSTRACT

A portable microfilm viewer for viewing a microfilm contained in a cassette. The viewer includes a housing with a lens system mounted therein. The cassette is removably received on a film transport mechanism which both supports and drives the film. A source of rotary motion is fixedly mounted on the housing and a bidirectional engaging device couples the rotary output to the film transport means for selectively transporting the film of the cassette in either of two directions across the lens system. The source of rotary motion can be a manual wheel or a motor device. A counter can be included for determining the film frame being viewed and for setting a desired film frame to be viewed, whereby the device will automatically stop when the desired film frame is in view. In an embodiment of the invention the microfilm viewer can also accommodate microfiche cards which can be viewed through the same lens system.

22 Claims, 19 Drawing Figures

PORTABLE MICROFILM VIEWER

BACKGROUND OF THE INVENTION

This invention relates to film viewing devices and more particularly to a portable viewer for viewing microfilm stored in a cassette.

With an increased number of information retrieval systems, there are presently available various types of information storage mediums. In many cases microfiche cards are used for storing information while other situations required use of storage on microfilm. With either type of storage medium a viewer is needed to permit easy access to the information stored on the medium.

Large viewing devices for such storage medium are readily available. Such devices are often utilized independently or in conjunction with other electronic equipment such as computerized input terminals and the like. However, often individual use of a viewer is needed and the expensive complex equipment is superfluous. It is rather important to have a portable hand held viewer to view such storage medium.

There has already been made available various microfiche viewers which can be hand held and utilized to read the information stored on the microfiche cards. Likewise various types of portable viewers for microfilm have also been made available. For example, U.S. Pat. No. 3,280,491 issued Oct. 25, 1966 to the present inventor describes a simplified microfilm viewer which operates on microfilm from a spool to spool arrangement and utilizing a windup spring for providing rotary motion through a gear train to a selective one of the spools to drive the film in a forward or reverse direction. U.S. Pat. No. 3,543,424 issued Dec. 1, 1970 to the present inventor describes another type of portable microfilm viewer where the film is contained in a cassette and has a motor pivoted in a housing. The motor can be selectively moved between two gears which are respectively associated with the two spools in the cassette. A third patent U.S. Pat. No. 3,589,043 issued June 29, 1971, to the present inventor describes a further type of portable microfilm viewer having film in a cassette with a spindle having a one way clutch mechanism connected to it. A drive wheel operates to respectively move the film between the spools in a forward or reverse direction.

While each of the aforementioned portable viewers for microfilm, as well as others, have useful and novel features each of them have some drawbacks which prevent them from becoming a widely used viewer. In some cases, the absence of a cassette may cause damage to the film which may jam the entire operation or mar the film. In other cases, the necessity of pivotally shifting the motor within the housing causes noise vibration and possible damage to the motor itself. In other situations, the complexity of the gearing or clutching mechanism increases the cost of both the cassette and the viewer making it impractical for regular individual use.

While a simple inexpensive microfiche viewer can be utilized for many applications, there is nevertheless needed a simple inexpensive microfilm viewer which can be efficient, small, easily operated, and durable. The use of microfilm provides a simple method of storing and accessing a mass amount of information. For example, on a single cassette even more than 2,000 frames can be provided. On a single cassette can be included diagrams and blueprints for circuits, dictionaries, educational lessons, and other types of information.

A simple portable microfilm viewer could be utilized for various purposes. By way of example, airlines could provide their passengers with such a viewer and accompanying cassettes enabling them to pre-tour their destination on flight or before their trip. Included could be information about sites to see, restaurants, and museums. Students could utilize such a viewer for learning various subjects at home or reviewing them in school. Law enforcement individuals could carry such a device with cassettes containing information involving license plates, mug shots, or other vital statistics. Public utilities could provide their servicemen with these devices having all service manuals and blueprints placed in cassette form. Additionally, drivers could utilize them with interchangeable cassettes having addresses and street maps for various cities.

It is therefore evident that providing a successful portable microfilm viewer has almost unlimited use. However, heretofore, the available microfilm viewers have not been able to provide the needed functions necessary to satisfy the requirements for such a successful viewer.

SUMMARY OF THE INVENTION

It is accordingly an object of the present invention to provide a portable microfilm viewer which avoids problems of prior art devices.

Another object of the present invention is to provide a portable microfilm viewer which is simple in design, easy to operate, simple to manufacture, small, and lightweight.

A further object of the present invention is to provide a portable microfilm viewer which can accommodate microfilm in a cassette and permits interchanging of the cassettes.

Still another object of the invention is to provide a portable microfilm viewer which can be operated manually through a winding mechanism or automatically through a motor drive.

Another object of the present invention is to provide a portable microfilm viewer which includes a counter operatively identifying and displaying the film frame being viewed.

Still a further object of the present invention is to provide a portable microfilm viewer which permits presetting of a desired film frame to be viewed and causes the microfilm viewer to automatically stop when the desired film frame is in view.

Another object of the present invention is to provide a portable microfilm viewer which permits easy focusing of the viewing lens and appropriate framing of the film.

Still a further object of the present invention is to provide a portable microfilm viewer and a corresponding holder which changes viewing through a single lens into a binocular viewing system.

A further object of the present invention is to provide a portable microfilm viewer and an accompanying stand which supports the microfilm viewer and converts it into a table model.

Yet a further object of the present invention is to provide a portable microfilm viewer which can also accommodate microfiche cards selectively permitting viewing through a common lens, either the microfilm or the microfiche.

These and other objects, features and advantages of the invention will, in part, be pointed out with particularity, and will, in part, become obvious from the following description of the invention, taken in conjunction with the accompanying drawings, which form an integral part thereof.

Briefly, the invention provides for a portable microfilm viewer having a housing with a lens system mounted in the housing. A film transport mechanism is secured in the housing and removably receives thereon a film cassette containing a microfilm. A drive means is fixedly mounted on that housing and provides a rotary output. A bidirectional engaging means couples the rotary output of the drive means to the film transport for selectively transporting the film of the cassette in either of two directions across the lens system.

In an embodiment of the invention the drive means is a manually wound knob, while in another embodiment of the invention the drive means is an electric motor. There is also provided a holder for receiving and retaining the housing. While the viewer itself includes a single eye piece for viewing the film, the holder includes a binocular system for converting monocular viewing through the single eyepiece into binocular viewing. Legs on the holder can support both the holder and housing converting it into a table model.

There is also provided a counting device which responds to the movement of the film and continuously counts and displays the instantaneous frame of the film being viewed. A control knob is available on the housing for resetting the counter. A second counter can also be included to preset a desired film frame so that when the desired frame is reached the movement of the film stops providing the desired film in a position for viewing.

The invention also contemplates additional microfiche means for receiving a sheet of microfiche which can be manipulated therein to permit viewing of the microfiche through the lens system of the viewer.

The invention also contemplates a cassette for use with such portable microfilm viewer which includes film spools within cylindrical chambers. The spools include coupling means which can retain the spools on a transport mechanism for both support and for driving of the spools. Appropriate windows are placed in the cassette to permit diffusing of light passing through the rear of the cassette through film placed thereinfront and then through a lens in front of the cassette.

BRIEF DESCRIPTION OF THE DRAWINGS

In the drawings.

In the various figures of the drawing, like reference characters designate like parts.

DESCRIPTION OF THE PREFERRED EMBODIMENTS

Figure 1:
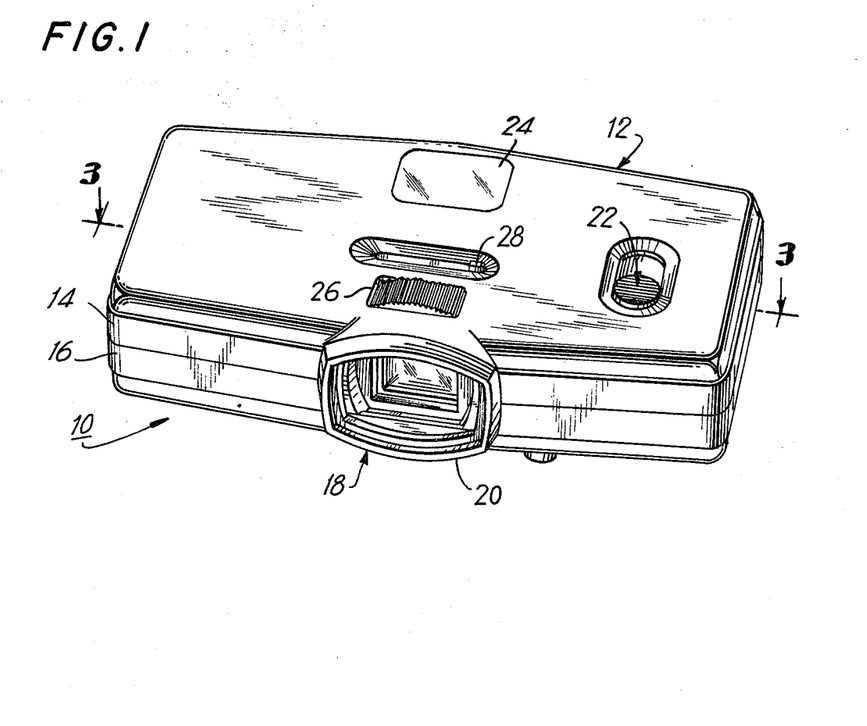
FIG. 1 is an isometric view of the viewer taken from the top side.
Figure 2:
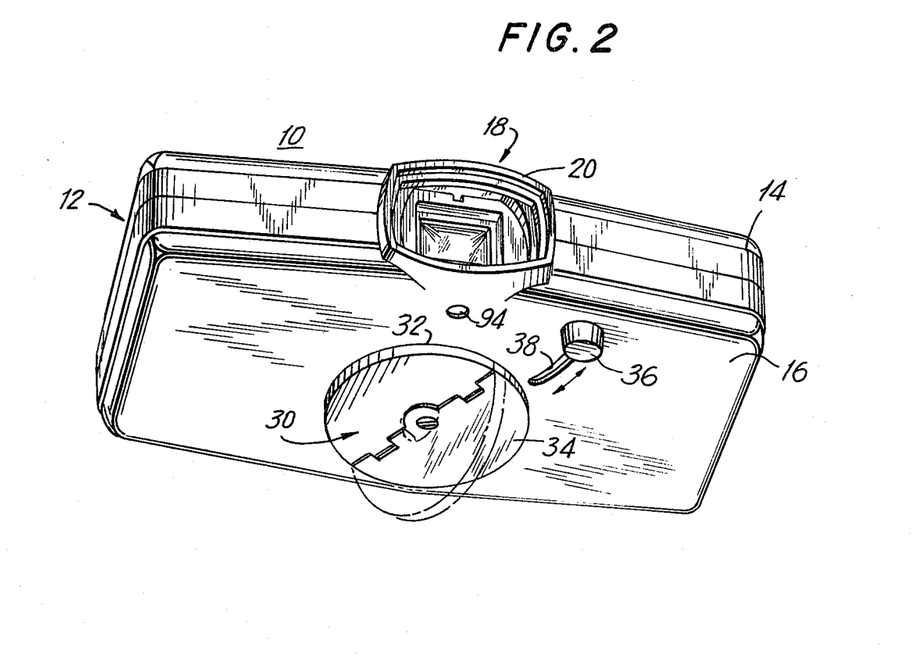
FIG. 2 is an isometric view of the viewer taken from the bottom side.

Referring now to FIGS. 1 and 2 there is shown the portable microfilm viewer 10 having a housing 12 formed of an upper section 14 and a lower section 16. A lens assembly 18 extends through the front of the housing and includes a front hood 20 for permitting easy viewing of the microfilm. A slide switch 22 is provided on the upper section 14 for turning on the source of artificial illumination contained within the housing. At the same time a translucent window 24 is also provided for permitting ambient light from the atmosphere to be utilized instead of the source of artificial illumination when sufficient light is present. A serrated knob 26 is available on the upper section for proper focus adjustment of the lens, and a slide lever 28 is also available for proper framing of the film within the optical path.

On the lower section 16 is provided an advancing knob 30 for manually advancing and retarding the microfilm to select the proper frame for viewing. The advancing knob is formed as a split knob with one section 32 hinged to a fixed section 34 to permit its movement downward, as shown in dotted line, to permit easy manipulation of the knob. A reversing slide switch 36 is provided which can move within slot 38 to permit forward and reverse movement of the film.

Figure 3:
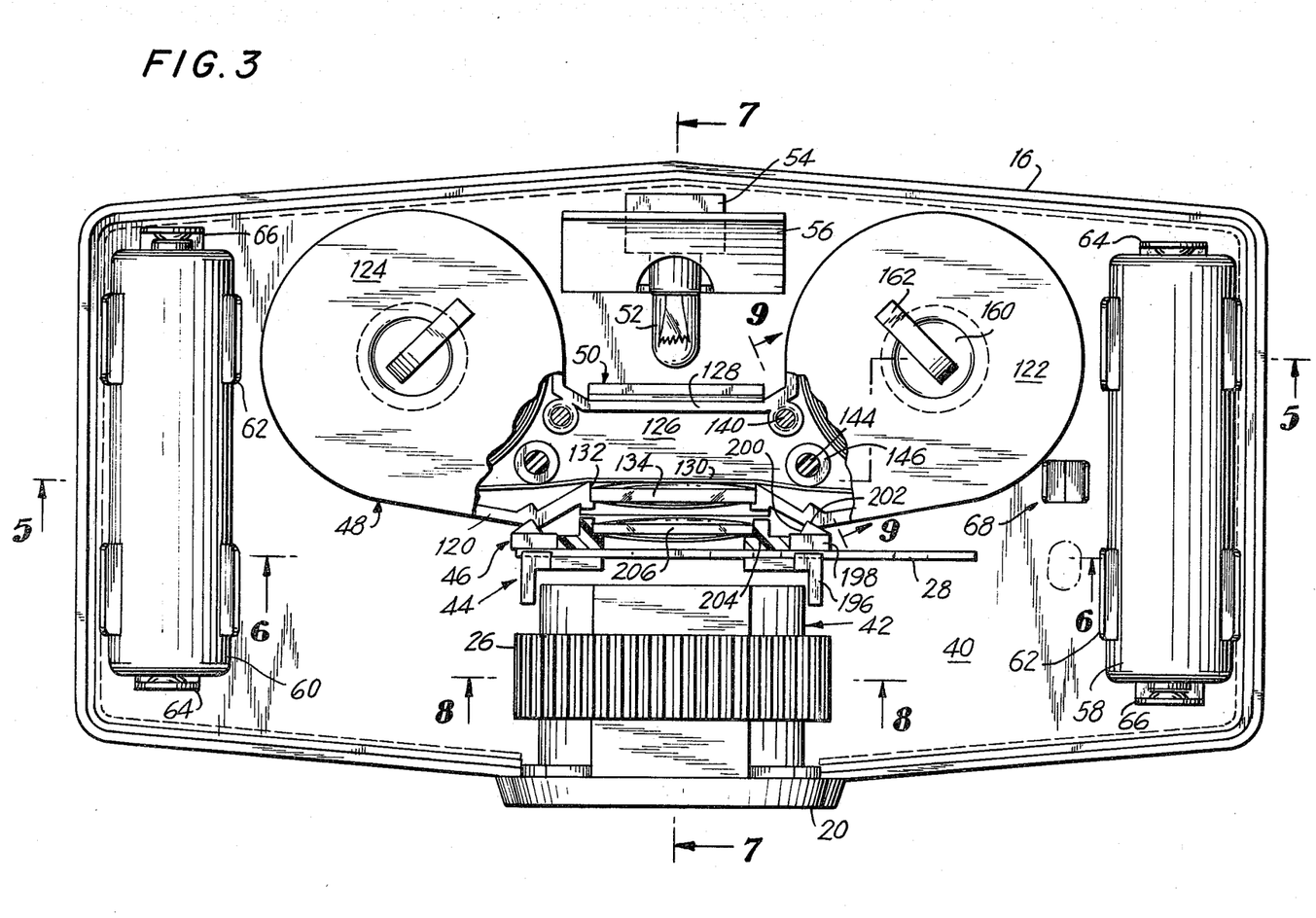
FIG. 3 is a plan view of the upper layer of the viewer with the top cover removed.
Figure 4:
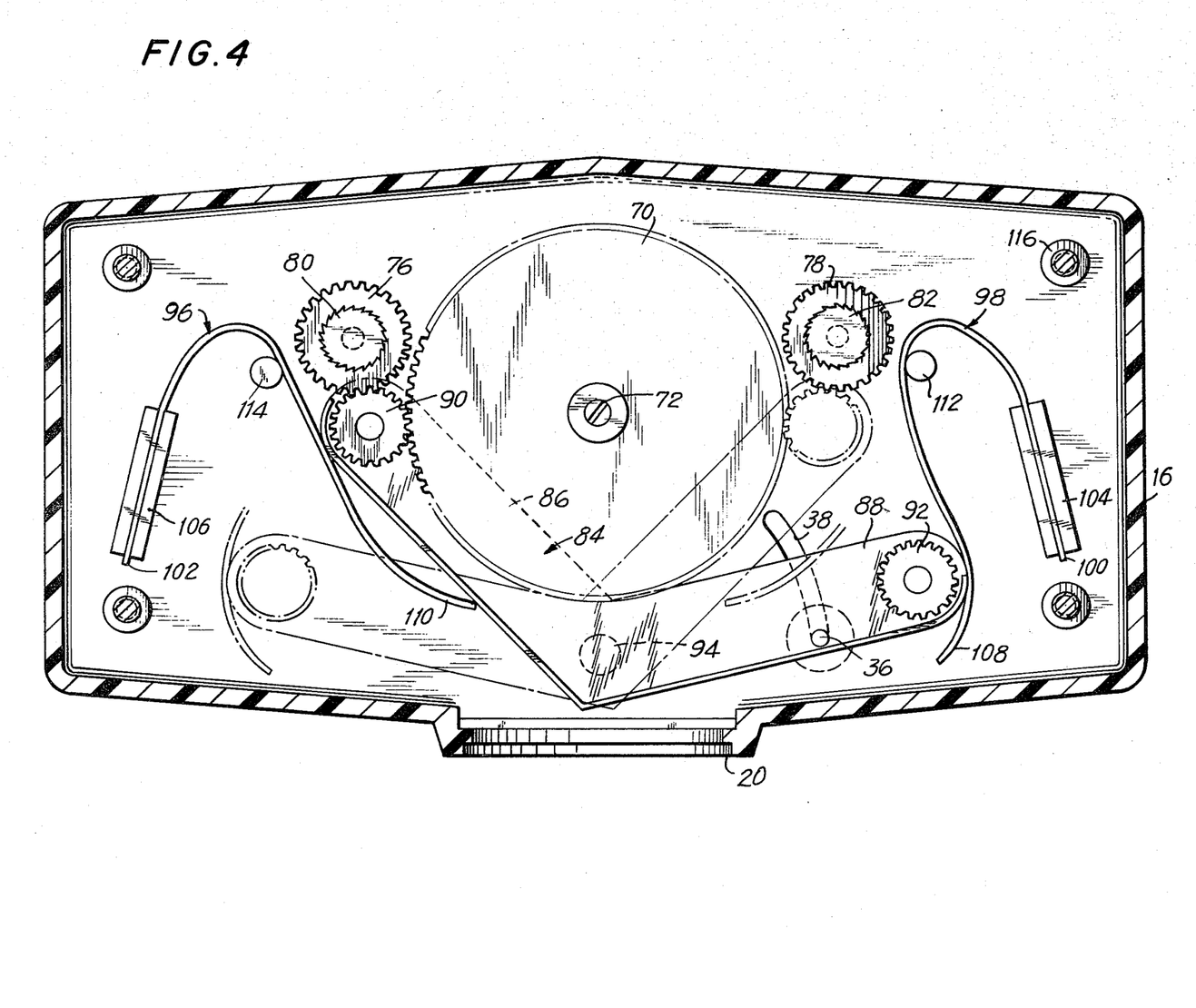
FIG. 4 is a sectional plan view of the viewer showing the lower level.

With the upper section of the housing removed, there is revealed an upper layer shown in FIG. 3 supported on a mounting plate 40 and a lower layer shown in FIG. 4 supported directly on the inside of the lower housing section 16.

Referring now to FIG. 3 the general construction of the viewer is seen to include a lens case 42 forming part of the lens assembly with the serrated focusing knob 26 surrounding the lens case. A framing mechanism 44 is placed rearward of the lens case and includes the slide lever 28 for adjusting the framing. An additional lens 46 is supported in the housing rearward of the framer 44. A film cassette 48 is positioned between the additional lens 46 and a support ridge 50 to remain securely in place. At the rear of the housing is a lamp 52 mounted in a lamp holder 54 and having an angular reflecting surface 56 positioned thereabout.

The lamp is energized by means of the batteries 58, 60 which are held in battery clips 62 and make contact between negative terminal 64 and positive terminal 66. Wires (not shown) would interconnect the battery with the lamp to form a complete closed circuit. Serially placed within the circuit is a switch 68 which is controlled by means of the slide switch 22 shown in FIG. 1.

Figure 7:
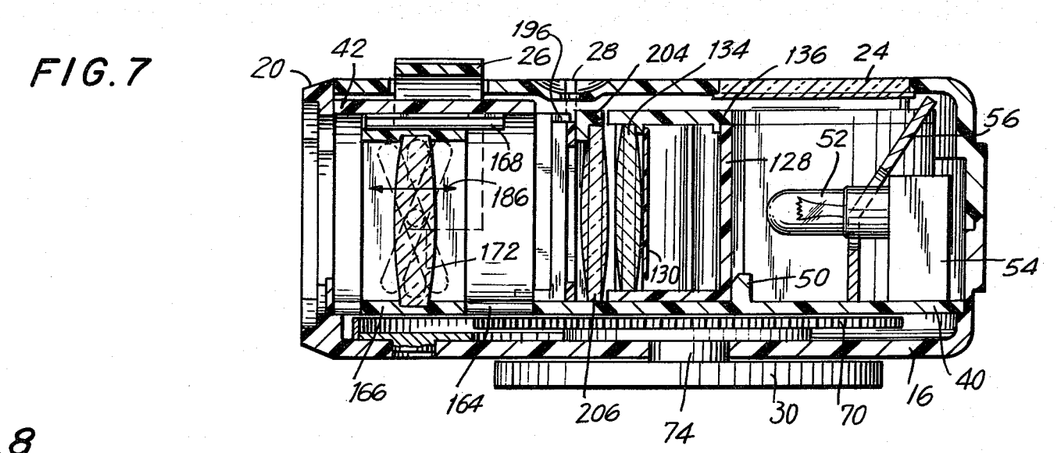
FIG. 7 is a sectional view taken along line 7—7 of FIG. 3 and especially showing the optical path of the optical system.

Referring now to FIG. 4 there will be explained the driving operation of the viewer. Centrally located in the bottom of the housing is an input drive gear 70 which is connected by screw 72 to the advancing knob 30. A spacer bushing 74, as shown in FIG. 7, interconnects the input gear 70 with the advancing knob 30 through an opening in the bottom of the lower section 16 of the housing. Two spur gears 76, 78 are respectively spaced parallel axes with respect to the input gear 70 and serve as the transport mechanism for driving the film spools, as will hereinafter be explained. Connected to the spur gears are ratchet wheels 80, 82 which upwardly extend therefrom. A bell crank 84 is provided with arms 86, 88 having idler gears 90, 92 respectively positioned at their remote ends. The common central point of the bell crank is pinned by a pivot 94 which extends into the housing, as can be seen in FIG 2. The slide switch 36 which selects forward and reverse movement is rigidly secured to arm 88 and can slide through the slot 38 in the housing 16.

When the bell crank is in position shown by the solid line, with the lever 36 in its lower position in the slot 38, arm 86 causes idler gear 90 to meshingly engage the input gear 70 and the drive gear 76 which will cause the ratchet gear 80 to rotate. When the lever 36 is moved to its uppermost position in the slot 38, it will move the bell crank to its position shown in the dotted line whereby idler gear 92 will be meshingly engaged between the input gear 70 and the drive gear 78 causing the ratchet gear 82 to operate.

Leaf springs 96, 98 are respectively associated with each of the two ends of the bell crank arms. One end of each leaf spring 100, 102 is respectively fixed within the anchors 104, 106 attached to the housing. The free ends of the leaf springs 108, 110, are free to engage the arms of the bell crank. The posts 112, 114 are respectively provided for permitting the leaf springs to be bent into a compressed condition. Each leaf spring will be in a compressed condition when its respective arm moves its idler gear out of operational engagement with the input gear. As shown, leaf spring 98 is in a compressed condition holding the arm 88 out of engagement and at the same time retaining the opposite arm 86 to have the idler gear 90 engaging the input gear. When the lever 36 is moved to its opposite condition, the leaf spring 96 would be in compressed condition to hold the bell crank fixed while the leaf spring 98 would be in a relaxed position.

Mounting posts 116 on the inner surface of the housing section 16 are utilized to support the mounting plate 40 and also to receive mounting screws not shown which are positioned beneath the batteries and hold the mounting plate and its equipment in place in the housing.

Figure 5:
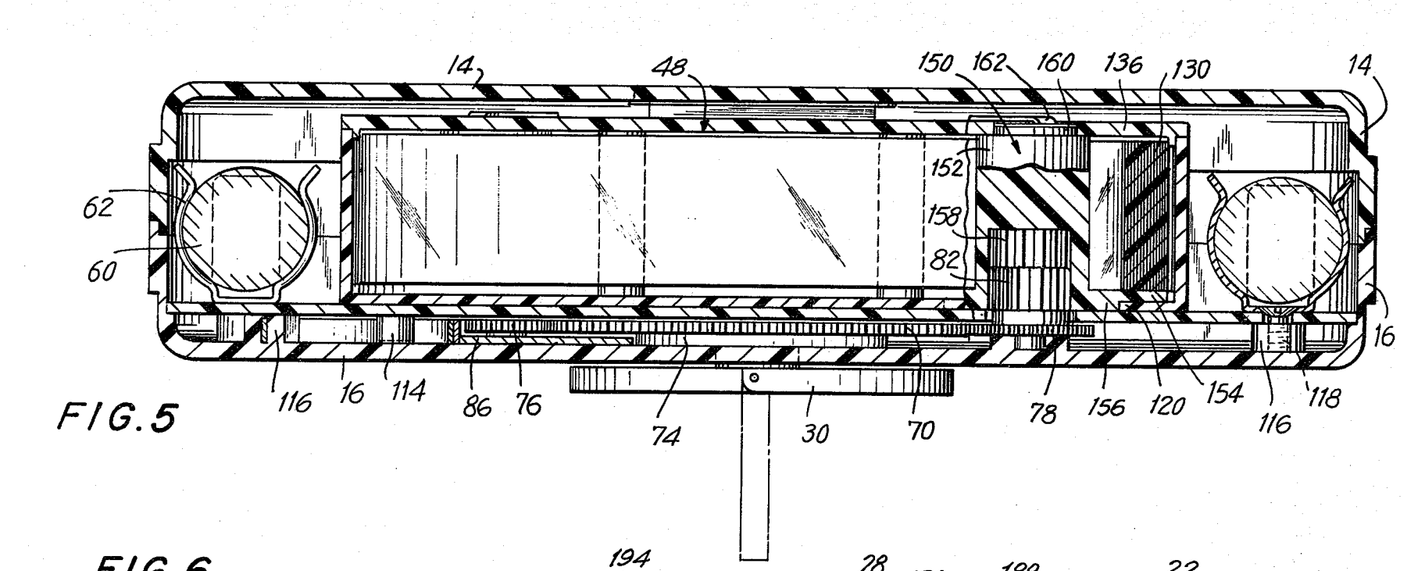
FIG. 5 is a side sectional view taken along lines 5—5 of FIG. 3 and especially showing the interconnection between the cassette and the transport mechanism.
Figure 9:
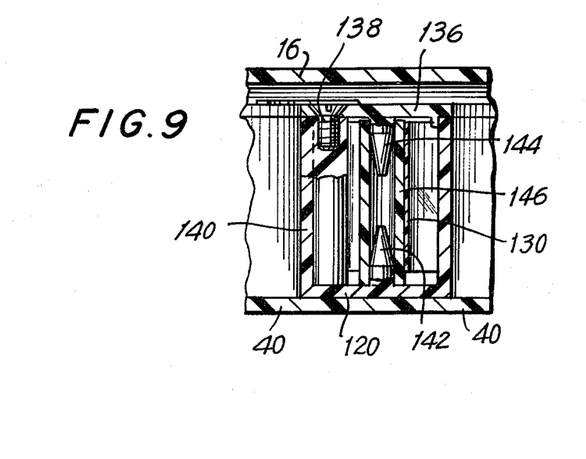
FIG. 9 is a fragmentary sectional view taken along line 9—9 of FIG. 3 and especially showing the guiding of the film in the cassette.

Referring now to FIGS. 3, 5, and 9, the details of the cassette construction will be explained. The cassette 48 includes a closed casing 120 having a pair of laterally spaced apart cylindrical chambers 122 and 124 and a channel section 126 interconnecting the chambers. The rear wall 128 of the channel section 126 is formed of translucent material to permit diffusion of the light from the lamp 52 against the rear surface of the film 130. The front section includes a window 132 which supports a square lens 134 for aiding in the focusing of the film.

The casing includes a removable cover 136 which is retained in place by means of screws 138 which fit into threaded bores 140 which are integrally formed with the casing wall and base 120. Guide pins 142 extending integrally with the base of the casing, and 144 integrally formed with the cover 136 of the casing extend into and hold a tubular column post 146 which serves as a rolling guide post against which the film 130 passes and is retained parallel against the lens 134 for avoiding skewing and optical slurring of the film.

Positioned within each of the cylindrical chambers of the cassette is a film spool 150 best seen in FIG. 5. The film spool includes a central post 152 having an outwardly extending base flange 154 which fits on the bottom wall of the cassette casing 120 and a lower hub 156 which fits within an opening in the casing to retain the spool flush with the chamber. A bore 158 formed with ratchet receiving walls is formed within the post 152 and is matingly associated with the ratchet wheel 82 connected onto the drive gear 78. Although mating latching gears are shown, any other type of keying device can be used. It will be noted that the film spool is supported by the drive gear and is also drivingly operated by the drive gear. Thus the cassette is inserted and held within the housing by means of the upwardly extending portions of the drive gears which provide support for the cassette. At the same time, by keying the film spool to that support, for example by the ratchet gears shown or other similar keying mechanism, driving force is provided to the film spools.

At the top of the spools 152 is a knob 160 which extends upwardly through a corresponding opening in the cover portion 136 of the casing. A resilient spring finger 162, best seen in FIG. 3 is connected to the cover 136 of the cassette casing and extends downward against the knob portion 160 to provide a drag onto the film spool to retard unwinding of the film within the cylindrical chambers.

Figure 8:
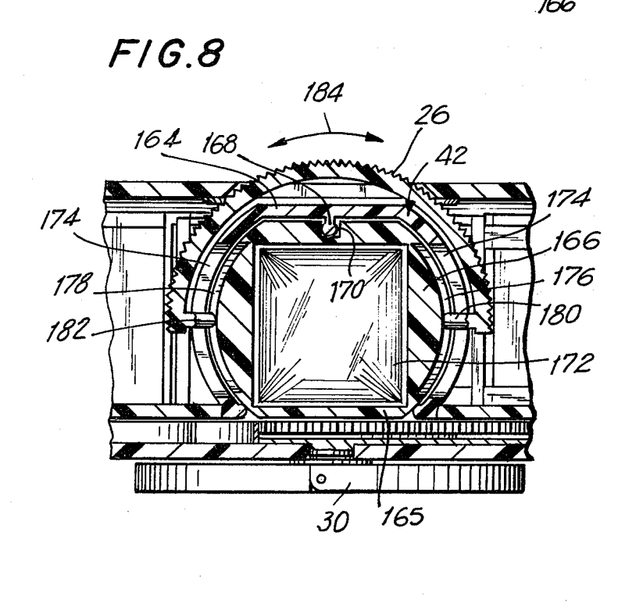
FIG. 8 is a sectional view taken along line 8—8 of FIG. 3 and especially showing the lens assembly.

The lens assembly can best be viewed with regard to FIGS. 3, 7 and 8. The lens assembly includes the lens case 42 which is formed of substantially cylindrical configuration with a flattened top section 164 and a flattened bottom section 165. A correspondingly shaped lens barrel 166 is placed within the lens case 164 and can axially move therein by means of the key 168 and corresponding key way 170. The lens barrel 166 supports a square lens 172. A radial slot 174 is formed in the outer wall of the lens case. Helical slots 176 and 178 are formed in the outer wall of the lens barrel 166. The various slots can be seen in FIG. 7 with the radial slots shown in dotted line in the center of the lens and the two helical slots shown in an "X" on either side thereof. The ring 26 includes inwardly extending pins 180, 182 which ride in the radial and helical slots. With the lens case 164 fixed to the housing as the ring 26 is rotated in the direction shown by the arrow 184 in FIG. 8 the lens barrel 166 will move axially therein as shown by the arrow 186 in FIG. 7. Turning of the knob 26 will therefore move the lens 172 axially along the optical path thereof to properly adjust the focusing relative to fixed lens 208 and cassette lens 134 to bring the microfilm into proper view.

Figure 6:
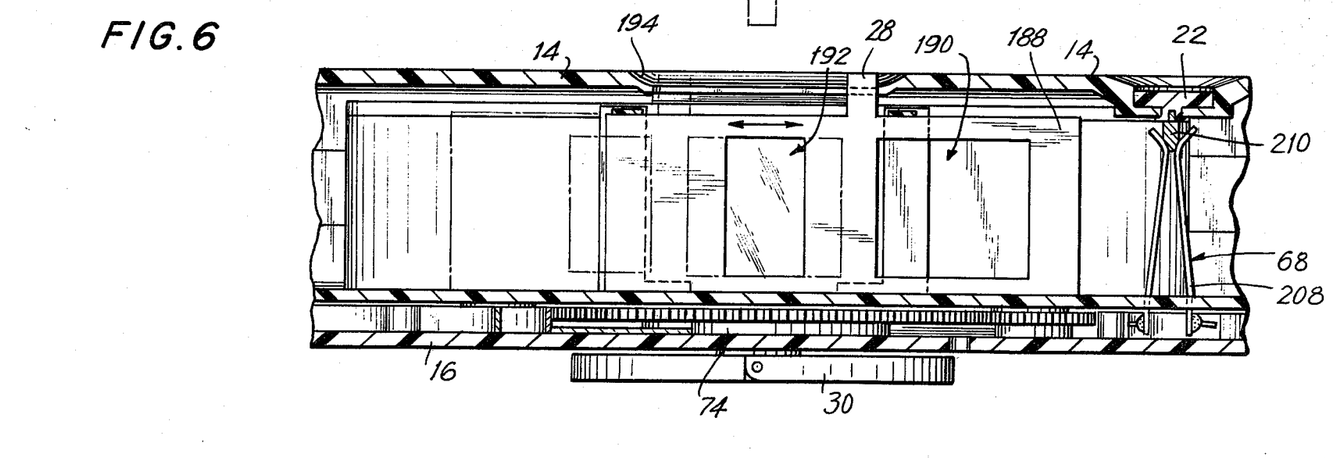
FIG. 6 is a side sectional view taken along line 6—6 of FIG. 3 and especially showing the film framing mechanism.

The framing apparatus 44 with its associated additional lens 46 can best be seen with regard to FIGS. 3, 6 and 7. The framer itself is a rectangular section 188 having a double sized window 190 and a single sized window 192 formed laterally therethrough. The actuating lever 28, as shown in FIG. 1 is permitted to slide within a slot 194 formed in the upper section of the housing 14. When moved to the right in the position shown in FIG. 6 a single frame will be viewed through the lens assembly. When moved to the left a double frame will be visable. This is appropriate for different size and millimeter film being utilized.

The framer is supported within a guide formed by the front brackets 196 and the rear brackets 198. The rear brackets include protrusions 200 which fit into mating grooves 202 in the cassette front wall to permit secure holding of the cassette in place. The supports 198 continue on to form the frame 204 which holds the additional lens 206 rearward of the framer.

The switch 68 for the light 52 is formed of two upwardly extending metallic prongs 208, as best seen in FIG. 6 which are normally spaced apart and which are interconnected by means of a metallic contact 210 coupled to the main on/off slide switch 22 on the upper section 14 of the housing. When interconnected, contact will be made to energize the lamp from the batteries.

In operating the device as shown, the upper section 14 of the housing is removed and a cassette is inserted in place over the drive gears. The upper section of the cover is then replaced. If sufficient ambient light is present it will enter through the translucent window 24 and reflect off the mirror 56 onto the optical path. If insufficient ambient light is present, the light switch is turned on to provide artificial illumination by means of the lamp. The focus is adjusted by means of the knob provided and the proper framing position is set. The forward/reversing lever is placed in a forward position and the advancing knob is turned until the desired frame is in position. At any point, the reversing knob can be placed in its reverse position and the advancing knob continues movement in the same direction whereby the film will reverse until the desired position is achieved.

Figure 10:
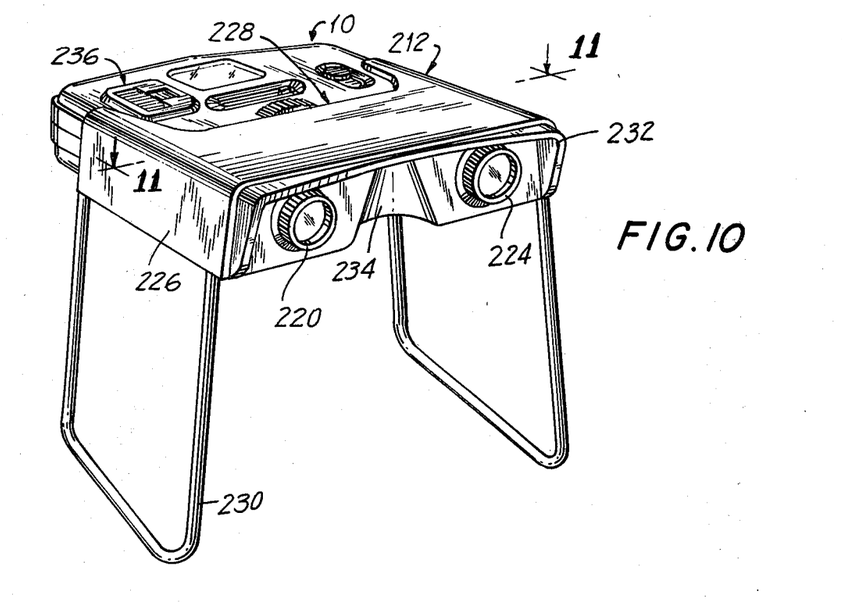
FIG. 10 is an isometric view showing the viewer in a table model holder.
Figure 11:
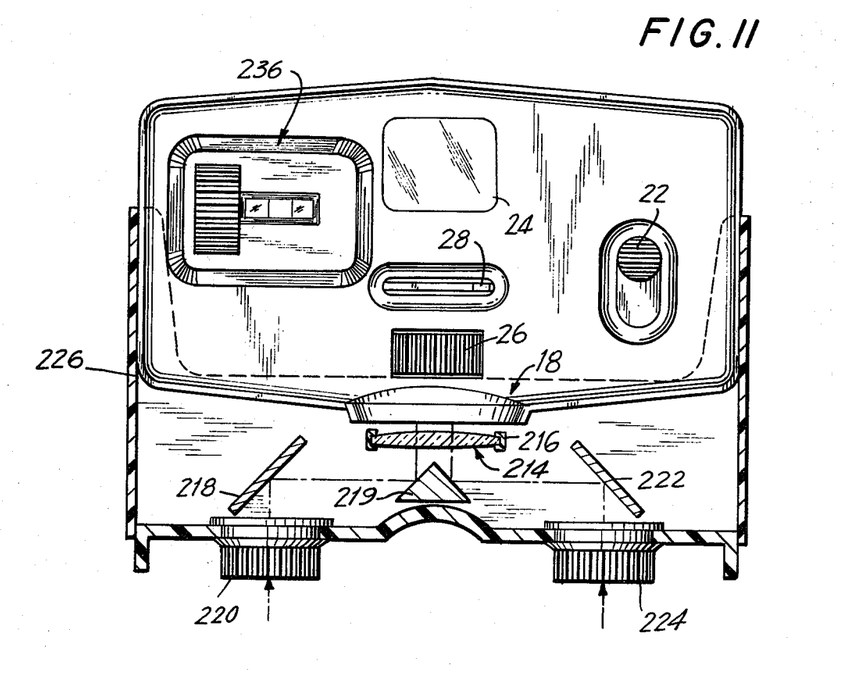
FIG. 11 is a plan sectional view of the holder with the viewer in it.

It will be noted that the lens system heretofore described on the housing includes only a single eyepiece for viewing of the film. Referring now to FIGS. 10 and 11 there will be shown a holder 212 which receives the viewer 10 and converts the monocular viewing system into a binocular system. As noted in FIGS. 10 and 11, the lens converting system includes a first lens 214 retained in the holder by supports 216. A prism 219 is positioned in the optical path of the lens 214 and splits the optical image directing one path against the angled reflecting mirror 218 to the output eyepiece 220 and reflecting another optical path along the angled reflecting mirror 222 through the optical eyepiece 224. In this manner, by using the binocular eyepieces 220, 224, two eyes can view the microfilm through the viewing lens system 18 although it is only a single lens eyepiece.

The holder is shaped with side walls 226 which extend substantially onto the viewer housing and with a cutout section 228 to permit access to the various knobs and dials on the viewer itself. The holder also includes legs 230 depending therefrom to permit placing of the viewer on a table or the like so that the portable unit can be made as a stand alone unit. A hood 232 is placed over the binocular system to shade the lenses, and a recess 234 is provided for conforming to the shape of the nose bridge to accommodate movement of the eyes directly adjacent the eyepieces 220 and 224.

Figure 12:
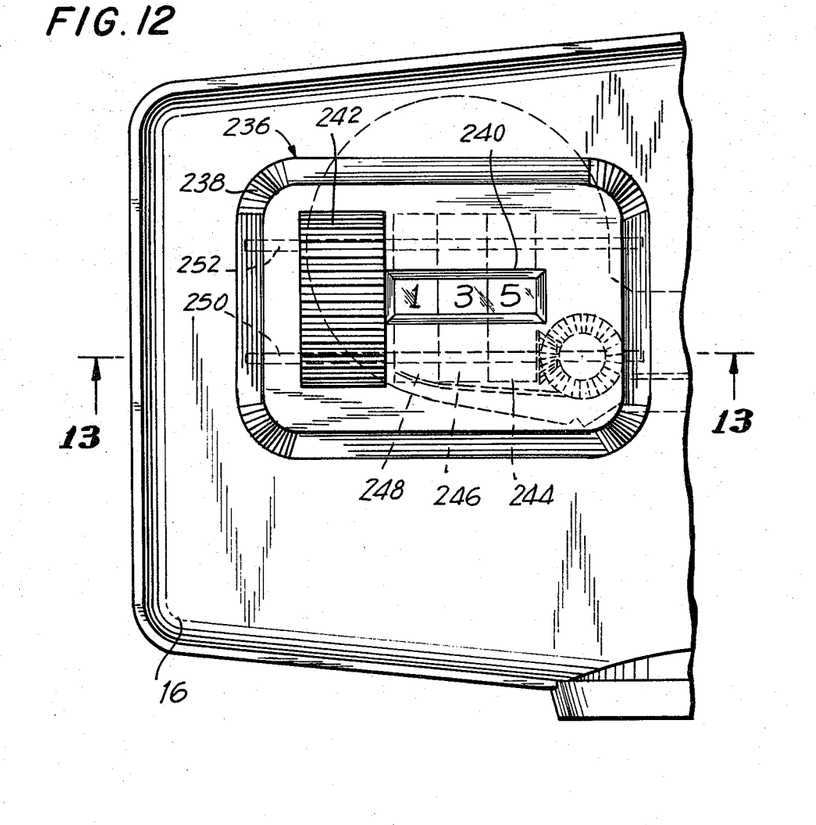
FIG. 12 is a fragmentary view of the housing of the viewer showing a readout counting mechanism.

Shown in FIGS. 10 and 11 is a counter 236 which will read out the frame of the film being viewed. The counter and its operation will now be explained in more detail with regard to FIGS. 12 and 13. The counter, shown generally at 236 is placed on the upper section 16 of the housing in a raised boss 238 which includes a window 240 through which a digital number is viewed, and an opening 241 through which a serrated adjusting knob 242 is available for resetting the readout number. The counter is formed of three belts 244, 246, 248 having consecutive numbers thereon and respectively representing the units, tens and hundreds position of a number. The belts are spaced between a drive shaft 250 and a driven shaft 252 so as to be maintained in an approximate oval shape. The adjusting knob 242 is also formed of an oval shaped belt interconnected between the drive and driven shafts. The counter belts 244–248 are interconnected in a conventional manner so that as one number reaches its tens position it moves the next adjacent belt a single position.

Figure 13:
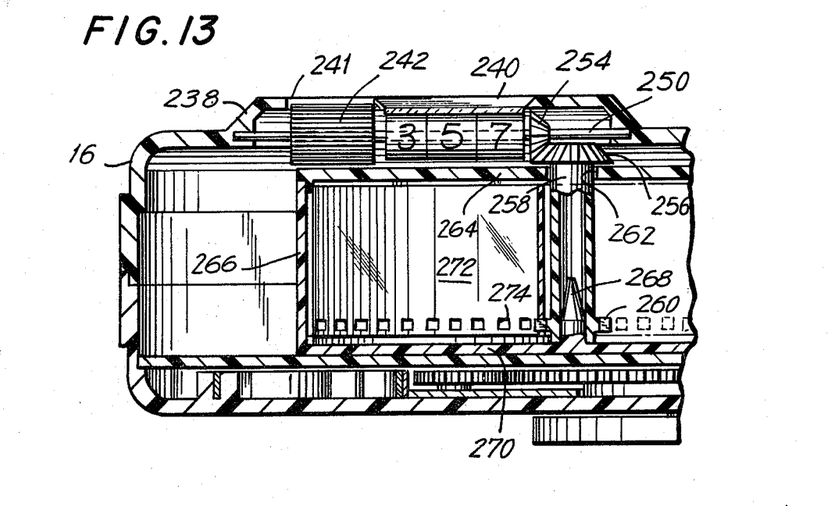
FIG. 13 is a fragmentary elevational sectional view taken along lines 13—13 of FIG. 12 and showing the counting and readout mechanism.

On the drive shaft 250 is a first bevel gear 254 which meshes with bevel gear 256 integral with a rotating post 258 having a sprocket 260 at its lower end. The rotating post extends into an opening 262 in the cover 264 of the cassette 266. It is retained in vertical alignment by means of the bearing post 268 formed integral with the bottom wall 270 of the cassette. The film 272 passes by the rotating post and the sprocket holes 274 engage the sprockets 260 causing the post 268 to rotate which in turn causes the beveled gears 256, 254 to rotate thereby rotating the drive shaft 250 causing the belt counters to move. The belt counters are adjusted so that their movement is coordinated with the frames of the film. In this manner, the output displayed through the window 240 will represent the instantaneous film frame number visible through the lens system of the viewer.

Figure 14:
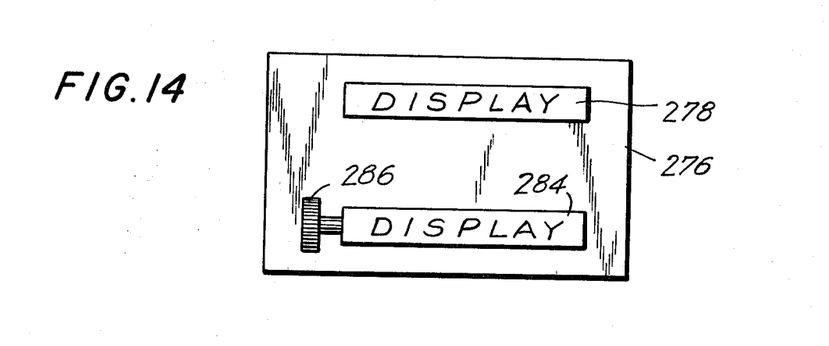
FIG. 14 is a schematic diagram showing a presettable counting mechanism and display.
Figure 15:
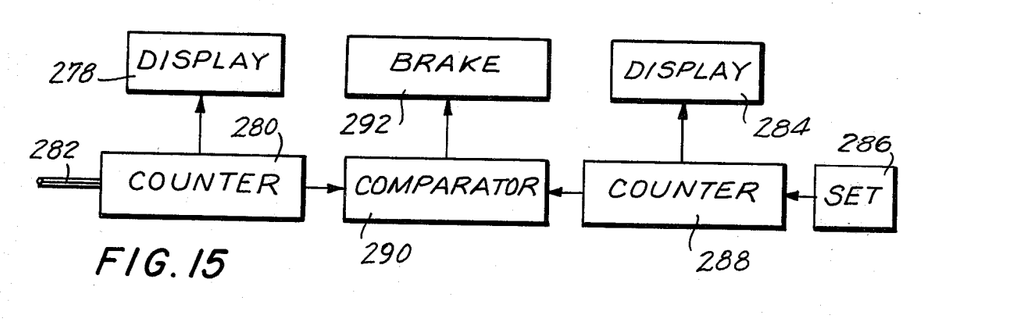
FIG. 15 is a schematic block diagram showing details of the counter setting mechanism.

Referring now to FIGS. 14 and 15, there will be noted that there is schematically shown a system which not only displays the instantaneous count of the film frame visible through the lens system but can preset a desired film frame number and have the viewer automatically select the desired film frame for viewing. There is shown schematically a display section 276 which would be included on the viewer housing and includes a first display 278 which displays the output of a counter 280 attached to a shaft 282 which receives the instantaneous film frame number. A second display 284 is provided with a setting knob 286 which can be preset with a desired film frame number. The number preset is fixed into a counter 288. A comparator 290 compares the count in the preset counter 288 with the instantaneous count of the film frame number and upon comparison produces an output signal which is sent to a brake mechanism 292 which stops the drive system.

In operation, the microfilm could include a table of contents or index on its first few pages. The index would include a listing of the material on the microfilm with a corresponding film frame number. The user would then select the particular item desired for viewing and preset the counter 288 with the film frame number of the material desired for viewing. That number would then be displayed on the first display 284. The drive mechanism can then be set in automatic mode so that the film is advanced in a continuous fashion. The counter 280 receives the instantanous film information from the sprocket holes of the film and continuously displays on display 278 the instantaneous film frame number. When the desired film frame is reached the drive mechanism will automatically stop to provide the desired film frame in view of the lens system. Any minor final adjustments can be made by manually adjusting the film into proper position in front of the viewing lens system.

Figure 16:
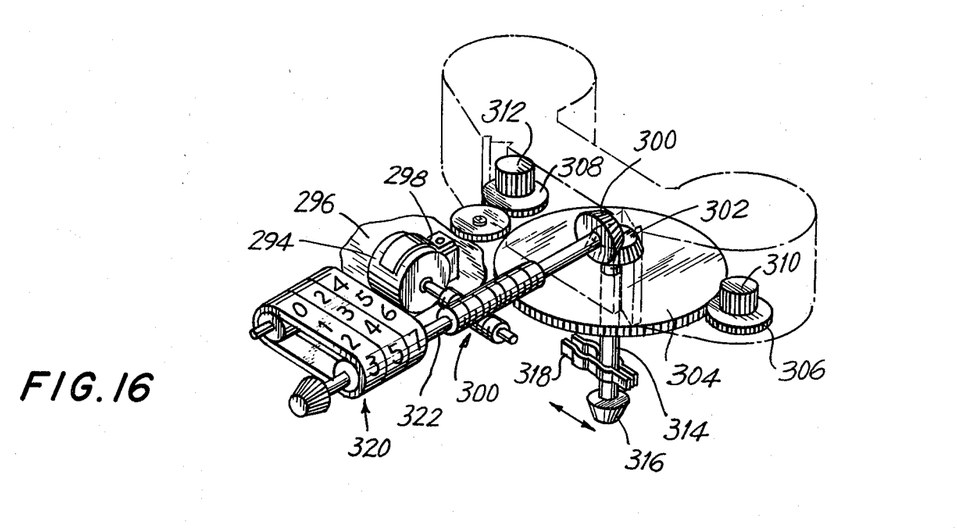
FIG. 16 is a schematic isometric drawing of a motorized drive mechanism for the viewer.

Although heretofore the drive system has been described as a manual drive using an the advancing knob, referring now to FIG. 16 is will be shown that an automatic drive source can also be utilized. Shown in FIG. 16 is an electricmotor 294 mounted on a portion of the viewer housing 296 by means of a mounting bracket 298. The output of the electric motor is coupled by means of a series of worm wheels 300 to a bevel gear 300 which operates the gear 302 coupled to the center shaft of the input gear 304. The drive gears 306, 308 include a ratchet gear 310, 312 thereon which can receive the film spools of the cassette shown in phantom. The shaft 314 of the input gear 304 terminates at its remote end in a knob switch 316 which can be positioned between spring clips 318 into a first position at the right hand side wherein the input gear 304 meshes with the drive gear 306, or to a left hand position where the input gear 304 meshes with the drive gear 308. The slide switch 316 provides the forward and reversing drive for the microfilm.

The belt counter 320 is shown coupled onto the shaft 322 of the worm gear and operates directly off the output of the electric motor rather than the sprocket holes of the film. This would permit use of a counter even with sprocketless film.

Although the use of a manual drive or a motor drive have been shown in separate embodiments, it will be obvious that the two can be combined into a single unit so that either manual or automatic operation can be selectively provided. This would be of special use in viewers which also incorporate the selective counting mechanism. In this manner the motor can be used to provide the fast forward movement for selecting the desired film frame to be viewed. Then, the manual drive could be used for final accurate selection and positioning of the film frame within view of the lens system. At the same time the manual could also be used to move single frames while the electric motor could be used for large scale movement.

Figure 17:
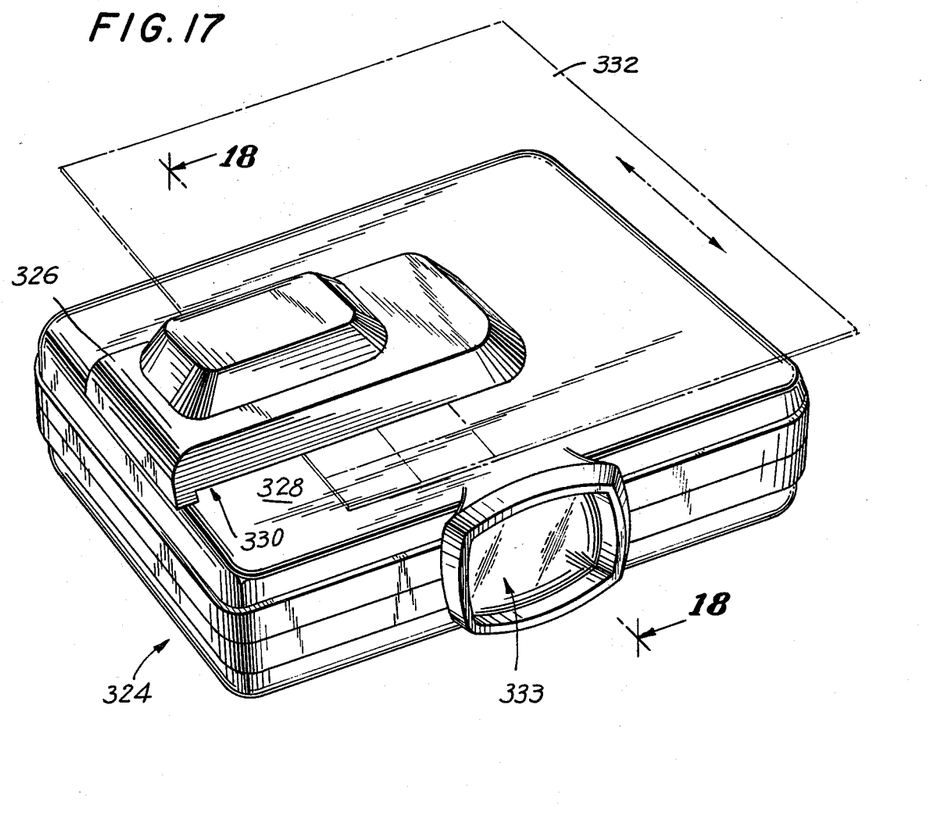
FIG. 17 is an isometric view of a combination microfilm and microfiche viewer.
Figure 18:
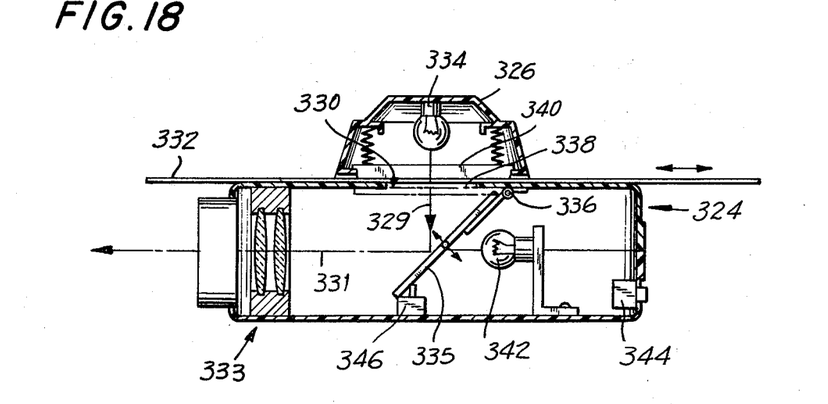
FIG. 18 is a sectional view taken along lines 18—18 of FIG. 17 and especially showing details of the optical system for microfilm and microfiche viewing.

Although the system heretofore described is for viewing microfilm alone, the viewer can be slightly modified to selectively accommodate not only microfilm but also microfiche cards. One embodiment of such combination viewer is shown in FIGS. 17 and 18. The basic viewer 324 is substantially of one of the aforedescribed types and will not be described in detail. Only the additional features accommodating the microfiche card will be explained. Specifically, a cantilevered cover 326 is added. The cover extends in an L-shaped arrangement over one side 328 of the housing and forms with the housing a passageway 330 through which there can be slid a microfiche card 332 in horizontal or vertical direction to select the appropriate microfiche page to be viewed. Because of the upper connection between the microfiche cover 326 and the housing wall 328, it will be necessary to reverse the microfiche card for viewing the lower half of the card. Within the microfiche cover 326 is contained a light source 334 lying along an axis 329 which is perpendicular to the optical axis 330 of the optical system 333. An angled reflecting mirror 335 is provided and is hingedly connected at 336 to the wall of the viewer 324. A window 338 is provided in the housing wall of the viewer adjacent to the pasageway 330. A platen 340 is spring held against the microfiche card to provide smooth movement of the microfiche card in the passageway and for holding the microfiche card in place. The light source 342 is provided along the optical axis 331 for use in viewing the microfilm. A main switch 344 is provided for energizing the light sources 342 and 334. However, the light sources operate in opposition to each other by means of the control microswitch 346 placed in the pivotal path of the mirror 334.

In operation the mirror 335 is normally biased to lie against the window 338 as shown in the dotted lines. In this position it is out of the optical path 331 and covers the window 338. Microfilm can then be placed across the optical path and when the switch 344 is energized the light source 342 is used for viewing the microfilm through the lens system 332. When it is desired to use the viewer for microfiche cards, the switch 344 can be adjusted to a different position which causes the mirror 335 to swing into its angled position as shown in FIG. 18. In doing so, the mirror will trigger the switch 346 which will extinguish the light source 342 and operate the light source 334. The light source 334 will shine through the microfiche card and through the window 338 on the viewer bouncing off the mirror 335 along the optical path 331 so that the microfiche cards can also be viewed through the same lens system 333.

Figure 19:
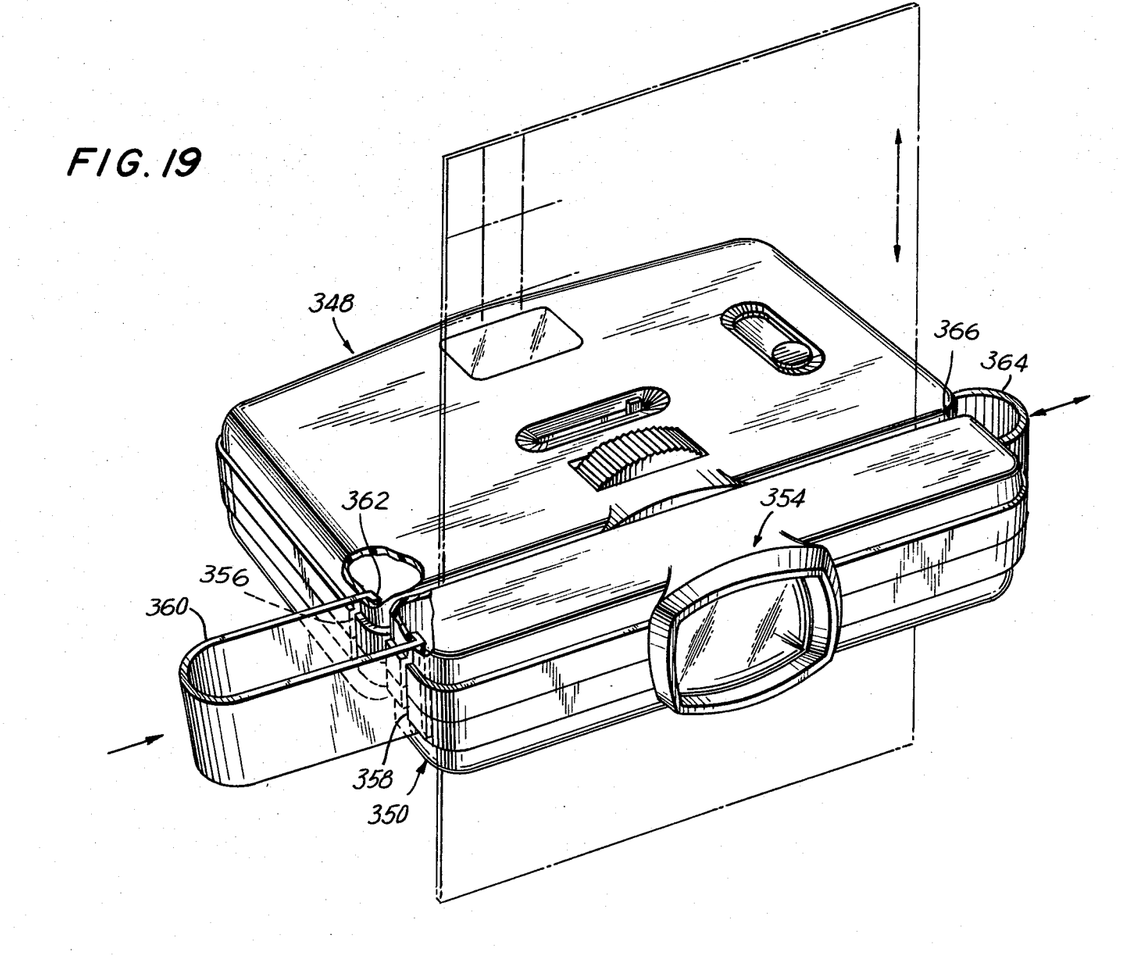
FIG. 19 is an isometric view of another embodiment of a combination microfilm and microfiche viewer.

Referring now to FIG. 19 there is shown an alternate embodiment of the combination microfilm and microfiche viewer. The microfilm viewer 348 is of any of the types previously described for microfilm viewing. However, it is formed in two sections, specifically a front section 350 and a rear section 352. The front sections contains a lens system 354 and the rear section 352 contains all of the other operating equipment of the viewer. Channels 356 and 358 are respectively formed in each of the front and rear sections 350, 352, and a U-shaped clip 360 has its legs slidably positioned within the channels. Stops 362 are placed at the end of the legs of the clip 360 to prevent its removal from the channel. A similar clip 364 is placed at the opposite end of the viewer.

In operation, the clips hold the front and rear sections in fixed spaced apart relationship forming a slot 366 therein which can receive a microfiche card passing through the slot. The microfiche card can be vertically moved through the slot to view all sections thereof and with horizontal movement the clips which can be pulled out to their maximum extent it would be sufficient to accommodate the farthest part of the microfiche card. Therefore all portions of the microfiche card could be viewed without having to invert the card.

When microfilm viewing is desired, the microfiche card is removed and the microfilm is viewed as heretofore explained. With the embodiment shown in FIG. 19 a single light source can be utilized for both the microfilm and microfiche viewing as well as the single lens system.

There has been disclosed heretofore the best embodiment of the invention presently contemplated. However, it is to be understood that various changes and modifications may be made thereto without departing from the spirit of the invention.

I claim:

1. A portable microfilm viewer for directly viewing microfilm comprising a housing, a lens system mounted in said housing, film transport means secured in said housing for removably receiving and supporting thereon a film cassette containing a microfilm, drive means fixedly mounted on said housing, said drive means having a rotary output, and bidirectional engaging means, fixedly mounted on said housing, for coupling said rotary output of said drive means to said film transport means for selectively transporting the film of the cassette in either of two directions across said lens system for said direct viewing and wherein said film cassette comprises a closed casing having a pair of laterally spaced apart cyclindrical chambers, and a channel interconnecting said chambers said channel having front and rear windows therein, a film spool respectively positioned in each chamber, coupling means on said film spools for retaining said spools on said transport means for thereby supporting said cassette and for drivingly interconnecting said spools with said transport means, and guide means in said channel for guiding film from one spool to the other along a path in opposition to said front window and wherein said casing further comprises lens means positioned in said front window and a translucent material positioned in said rear window, and drag means coupled to said film spools for retarding unwinding of film from said film spools.

2. A portable microfilm viewer as in claim 1 and wherein said transport means comprises a pair of drive spur gears rotatably mounted on said housing on spaced parallel axes, each drive gear having an axially extending ratchet wheel, said film cassette comprising a pair of film spools retained in spaced parallel relationship for respectively mounting onto said axially extending ratchet wheels, coupling means for keying said film spools to their respective ratchet wheels, said ratchet wheels both supporting said cassette as well as driving said film spools, and wherein said engaging means comprises means for selectively engaging said drive means with one of said drive gears to advance or reverse the movement of the film.

3. A portable microfilm viewer as in claim 2 and wherein said drive means comprises a handwheel rotatably mounted on said housing externally thereof for manual operation, an input gear coupled to said handwheel and located within said housing, and wherein said engaging means comprises means for selectively placing said input gear in meshing engagement with one of said drive spur gears.

4. A portable microfilm viewer as in claim 3 and wherein said engaging means comprises a bell crank, having extending arms, mounted on said housing, an idler gear rotatably located at the remote end of each arm of said bell crank and respectively associated with one of said drive gears, a switching lever rigidly secured to one arm of said bell crank and projecting through the housing for external manipulation thereof for selectively engaging one of said idler gears between its associated drive gear and said input gear, and biasing means for biasing said bell crank to retain the selected idler gear in its engaging position.

5. A portable microfilm viewer as in claim 2 and wherein said drive means comprises an electric motor rigidly mounted onto said housing, and wherein said engaging means comprises a gear train for selectively placing the output of said motor into engagement with one of said drive gears.

6. A portable microfilm viewer as in claim 1 and wherein said casing comprises a removable cover portion permitting access to said cylindrical chambers to thereby insert and replace a microfilm.

7. A portable microfilm viewer as in claim 1 and wherein said lens system further comprises a substantially cylindrical lens case fixed on said housing and including a radial slot in its outer wall, a lens barrel supporting a lens and mounted in said lens case for axial movement therein and including a helical slot in its outer wall, and a ring having inwardly extending pins riding in said radial and helical slots, a portion of said ring being positioned externally of said housing for defining means for adjusting the focusing.

8. A portable microfilm viewer as in claim 7 and wherein said lens is of square peripheral shape.

9. A portable microfilm viewer as in claim 1 and further comprising a source of artificial illumination mounted in said housing opposite said lens system and along the optical axis thereof, a translucent window mounted in a wall of the housing, and a reflecting surface angularly positioned between said translucent window and the optical axis for directing ambient light along the optical path so that the film can be selectively viewed by the ambient light or the artificial illumination.

10. A portable microfilm viewer as in claim 1 and wherein said lens system includes a single eyepiece for viewing the film and further comprising a holder for receiving and retaining said housing, a binocular system for converting monocular viewing through said single eyepiece into binocular viewing, and legs depending from said holder to support said holder and housing, and wherein said binocular system comprises a lens adjacent said single eyepiece within said holder and a prism adjacent said lens along the optical path of said lens, said prism splitting an optical image thereon onto two angled mirrors which reflect said image through two optical eyepieces respectively for said binocular viewing.

11. A portable microfilm viewer as in claim 1 and further comprising counting means responsive to the movement of the film for continuously counting and displaying the instantaneous frame number of the film as it moves, and a control knob having a portion thereof positioned externally of the housing for defining means for resetting said counting means.

12. A portable microfilm viewer as in claim 11 and further comprising a second counting means for presetting a desired film frame number, comparator means for comparing the preset frame number with the instantaneous frame number, and brake means responsive to said comparator means for stopping the film when the desired frame number is reached.

13. A portable microfilm viewer as in claim 1 and further comprising a rotating post having a spocketed end and a gear adjacent the other end, said sprocket end extending into said cassette, support means in said cassette for maintaining said sprocketed end in rotating engagement with sprocket holes of the microfilm, a driving shaft operated by said gear, a driven shaft in spaced parallel relationship with said driving shaft, a belt counter extending between said driving and driven shaft for providing a count of the instantaneous frame of the moving film, a window in said housing for viewing the output count of the belt counter, and a control belt extending between said driving and driven shaft for resetting said belt counter.

14. A portable microfilm viewer as in claim 1 and further comprising microfiche means for receiving therein a microfiche card and for permitting manipulation of the microfiche card therein, whereby said microfiche card can be viewed through said lens system.

15. A portable microfilm viewer as in claim 14 and wherein said housing comprises front and rear sections, retaining means for holding said front and rear section in spaced apart relationship to define therebetween a slot of substantially constant width, said slot adapted to receive passage therethrough of a microfiche card, and wherein said front section supports said lens system and said rear section supports the other parts of the viewer.

16. A portable microfilm viewer as in claim 15 and wherein said retaining means comprises channels formed in said front and rear sections, U-shaped clips slidably retained in said channels, and stop means preventing removal of said clips from said channels.

17. A portable microfilm viewer comprising a housing, a lens system mounted in said housing, film transport means secured in said housing for removably receiving thereon a film cassette containing a microfilm, drive means fixedly mounted on said housing, said drive means including an input gear having a rotary putput, and bidirectional engaging means for coupling said rotary output of said drive means to said film transport means for selectively transporting the film of the cassette in either of two directions across said lens system and wherein said transport means comprises a pair of drive gears rotatably mounted on said housing on spaced parallel axes, said film cassette comprising a pair of film spools retained in spaced parallel relationship, for respectively mounting onto said drive gears, coupling means for keying said film spools to their respective drive gears and wherein said engaging means comprises a bell crank having extending arms mounted on said housing, an idler gear rotatably located at the remote end of each arm of said bell crank and respectively associated with one of said drive gears, a switching lever rigidly secured to one arm of said bell crank and projecting through the housing for external manipulation thereof for selectively engaging one of said idler gears between its associated drive gear and said input gear, and biasing means for biasing said bell crank to retain the selected idler gear in its engaging position, and wherein said biasing means comprises leaf springs respectively associated with each of said bell crank arms, each leaf spring having a fixed end remote from said bell crank and a free end in engagement with its respective bell crank arm, each leaf spring being in a compressed condition when the idler gear on its respective arm is out of operational engagement.

18. A portable microfilm viewer for directly viewing microfilm comprising a housing, a lens system mounted in said housing, film transport means secured in said housing for removably receiving and supporting thereon a film cassette containing a microfilm, drive means fixedly mounted on said housing, said drive means having a rotary output, and bidirectional engaging means, fixedly mounted on said housing, for coupling said rotary output of said drive means to said film transport means for selectively transporting the film of the cassette in either of two directions across said lens system for said direct viewing, and wherein said lens system comprises an adjustable lens and a fixed lens in axially spaced apart relationship with each other, and a lens framer of fixed dimensions positioned therebetween and including a lever having a portion thereof positioned externally of the housing for defining means for adjusting the frame position.

19. A portable microfilm viewer comprising a housing, a lens system mounted in said housing, film transport means secured in said housing for removably receiving thereon a film cassette containing a microfilm, drive means fixedly mounted on said housing, said drive means having a rotary output, and bidirectional engaging means for coupling said rotary output of said drive means to said film transport means for selectively transporting the film of the cassette in either of two directions across said lens system said microfilm viewer further comprising microfiche means for receiving therein a microfiche card and for permitting manipulation of the microfiche card therein, whereby said microfiche card can be viewed through said lens system, and wherein said microfiche means comprises a cover member cantilevered from said housing, said housing and cover member defining therebetween a narrow passageway oriented parallel to the optical path of said lens system, said passageway adapted to receive passage therethrough of a microfiche card, a window in said housing facing said passageway, a first source of illumination supported in said housing positioned along said optical path and capable of illuminating the microfilm, a second source of illumination supported in said cover means and positioned along a line perpendicular to said optical path and capable of illuminating the microfiche card a mirror angularly positioned between said optical path and said second source of illumination, and selection means for selectively operating one of said sources of illumination.

20. A portable microfilm viewer as in claim 19 and wherein said mirror is normally biased against said window during illumination of said first illumination means, control means for moving said window to its angular position, and switch means operated by the movement of said mirror for transferring illumination control between said first and said second illumination means.

21. A combination microfilm and microfiche viewer comprising, a housing, a lens system mounted in said housing, film transport means secured in said housing for removably receiving thereon a film cassette containing a microfilm and for selectively transporting the microfilm in either of two directions across said lens system to permit viewing of the microfilm through said lens system, and microfiche means for receiving therein a microfiche card which can be manipulated therein to thereby permit viewing of the microfiche card through said lens system and selective illumination means for each of said microfilm and microfiche viewing to the exclusion of illumination of the nonselected mode.

22. A combination viewer as in claim 21 and further comprising selection means for selectively permitting the viewing of either the microfilm or the microfiche card.

* * * * *